(12) United States Patent
Watts et al.

(10) Patent No.: US 6,238,131 B1
(45) Date of Patent: May 29, 2001

(54) DRAPER BELT CONNECTOR ASSEMBLY FOR A HARVESTING MACHINE

(75) Inventors: Bradley James Watts, Eldridge, IA (US); David Walter Kmoch, Geneseo, IL (US); Thomas G. Teller, Faribault, MN (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/321,368

(22) Filed: May 27, 1999

(51) Int. Cl.[7] ....................................................... F16B 5/02
(52) U.S. Cl. ............................... 403/337; 24/37; 474/257; 198/844.2; 56/181
(58) Field of Search .................................. 403/337, 338, 403/335, 24; 474/253, 255, 256, 257; 198/844.2; 56/177, 364, 181, 14.5; 24/37, 31 B

(56) References Cited

U.S. PATENT DOCUMENTS

| 390,233 | * | 10/1888 | Jackson | 24/37 |
|---|---|---|---|---|
| 453,019 | * | 5/1891 | McCombs | 24/37 |
| 1,235,656 | * | 8/1917 | Cobb | 24/37 |
| 1,570,801 | * | 1/1926 | Vollrath | 24/37 |
| 1,803,354 | * | 5/1931 | Purple | 24/37 |
| 1,818,297 | * | 8/1931 | Bowlus | 24/37 |
| 4,419,856 | | 12/1983 | Taylor . | |
| 4,489,827 | * | 12/1984 | Anderson | 198/844.2 |
| 4,540,389 | * | 9/1985 | Ramsey | 474/257 |
| 4,757,576 | * | 7/1988 | Jaubert | 24/37 X |
| 4,906,226 | * | 3/1990 | Hecker et al. | 474/257 |
| 5,005,343 | | 4/1991 | Patterson . | |
| 5,136,832 | * | 8/1992 | Sund | 56/364 |
| 5,884,980 | * | 3/1999 | Visser et al. | 307/6.1 |

FOREIGN PATENT DOCUMENTS

| 340 20 179 | | 12/1985 | (DE) . | |
|---|---|---|---|---|
| 15671 | * | of 1885 | (GB) | 24/37 |
| 16856 | * | of 1887 | (GB) | 24/37 |
| 322536 | * | 12/1929 | (GB) | 24/37 |

* cited by examiner

*Primary Examiner*—Harry C. Kim

(57) ABSTRACT

A connector assembly for a draper belt in a harvesting machine having first and second connecting bars on opposite sides of belt end flanges. One connecting bar has a plurality of bores while the other has a plurality of fixed studs. The studs project through the apertures in the belt end flanges and the bores in the first connecting bar. The connecting bars are held together by lock nuts. By fixing the studs to the connecting bar, separate bolts are eliminated and only one wrench is needed to drive the nuts. Lock washers are eliminated by the use of lock nuts.

3 Claims, 2 Drawing Sheets

DRAPER BELT CONNECTOR ASSEMBLY FOR A HARVESTING MACHINE

BACKGROUND OF THE INVENTION

1. Field of the Invention

The present invention relates to harvesting machines that have a draper belt for conveying crop material, and in particular to a connector assembly for coupling the ends of the draper belt together.

2. Description of Related Art

Draper platforms for harvesting equipment have one or more flat, wide belts, preferred to as a draper or draper belt, to convey crop material. The arrangement and the number of belts vary among platforms. One style of platform has two side belts that convey crop material laterally to the center of the platform where a feed belt moves the crop material longitudinally into the harvesting machine. The draper belts have two ends that are joined together to form a continuous belt. At each end of the belt, an upstanding flange is provided. These belt end flanges are joined together by a connector assembly to form a continuous belt. The connector assembly serves as a transverse cleat which, together with other cleats formed along the belt length, functions to convey crop material in the direction of belt travel.

A typical belt end connector assembly includes a pair of hollow square tubes placed on each side of the upstanding belt end flanges. The tubes have a plurality of apertures that align with mating apertures in the upstanding belt end flanges. Bolts are inserted through the connecting bars and the belt end flanges. A nut and one or more lock washers are placed on each bolt to hold the connecting bars in place. When removing a belt for service of the platform or replacing a worn belt, a large number of nuts and bolts must be removed. Two wrenches are required to remove or install each bolt, one for the nut and the other for the bolt head. This results in a time consuming process to remove and reconnect a draper belt.

SUMMARY OF THE INVENTION

Accordingly, it is an object of the present invention to provide a connector assembly for the ends of a draper belt that requires less time to assemble and disassemble.

It is another object of the invention to provide a connector assembly for a draper belt that utilizes fewer fastener components and requires fewer tools to assemble and disassemble.

The present invention provides a connector assembly with two solid connecting bars. The first bar has a plurality of through bores. The second bar has a plurality of studs affixed thereto. The studs extend through the aligned apertures in the belt end flanges and the bores in the first connecting bar. Lock nuts are threaded onto the distal ends of the studs to hold the assembly together without the need for lock washers. By providing studs that are fixed to the connecting bar, only one wrench is needed for tightening each nut onto a stud.

A further feature of the invention is that the corner of the connecting bars that engages the belt at the base of the belt end flange is rounded to provide relief as the belt travels around the rollers. This avoids excessive belt wear.

DESCRIPTION OF THE PREFERRED EMBODIMENT

Figure 1:
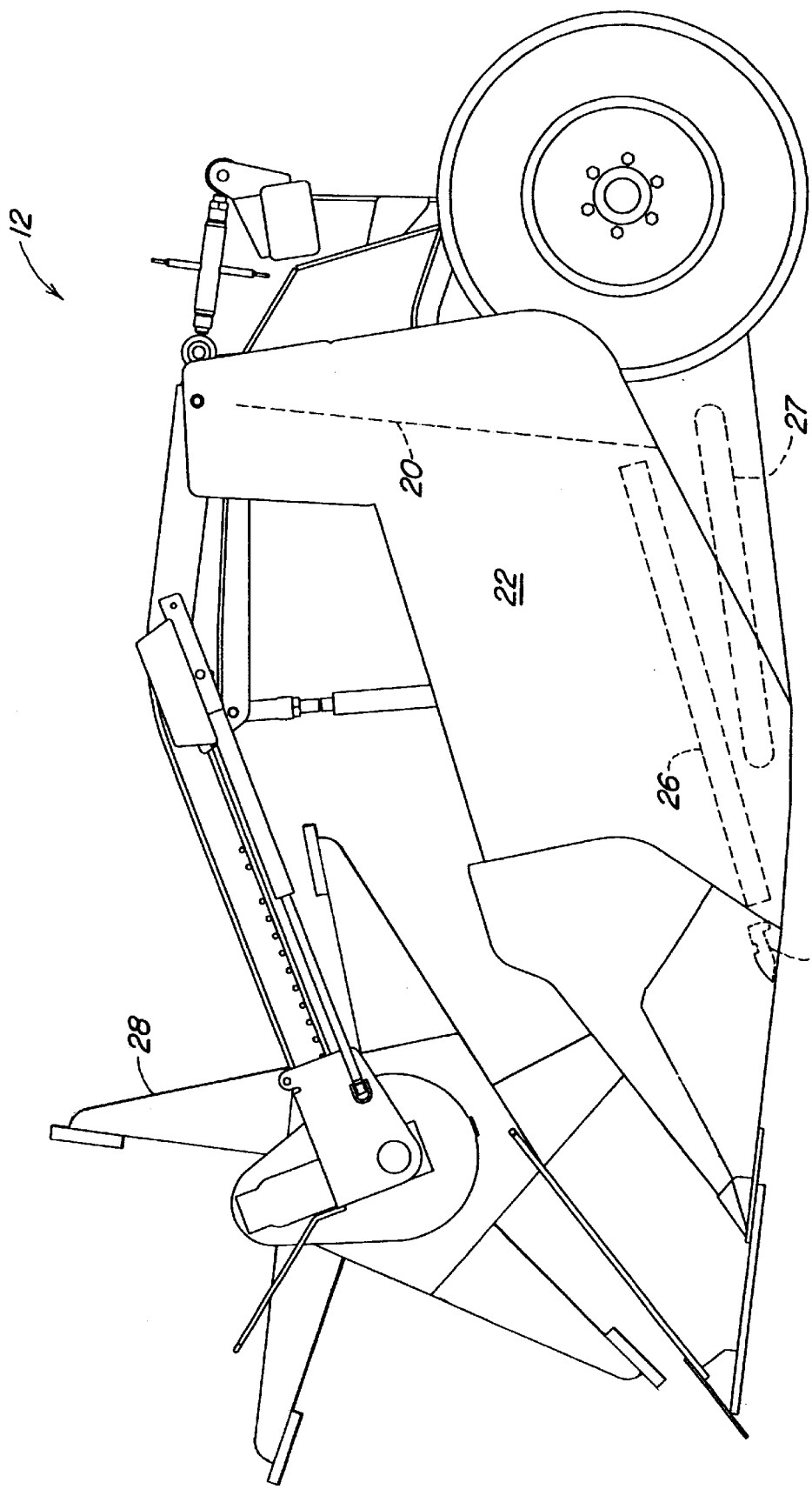
FIG. 1 is a side view of a draper platform for use with a combine harvester.

The invention is embodied in the grain cutting platform 12 of a combine shown in side elevation in FIG. 1. The platform 12 can be mounted to a combine feederhouse in a conventional manner and consists of a basic open front structure that includes a rear wall 20, opposite side sheets 22 and a cutterbar 24 spaced forward of the rear wall 20. One or more side draper belts 26 are provided between the cutterbar 24 and the rear wall 20 to convey crop material. The side belts move the crop laterally of the platform to a center feed belt 27 that moves the crop material longitudinally through an opening in the rear wall 20 and into the combine feederhouse. The belt arrangement shown is only one example of the many belt arrangements that may be used. A reel 28 rotates above the cutterbar 24 to hold the crop material against the cutterbar and move the cut crop material onto the draper belts.

Figure 2:
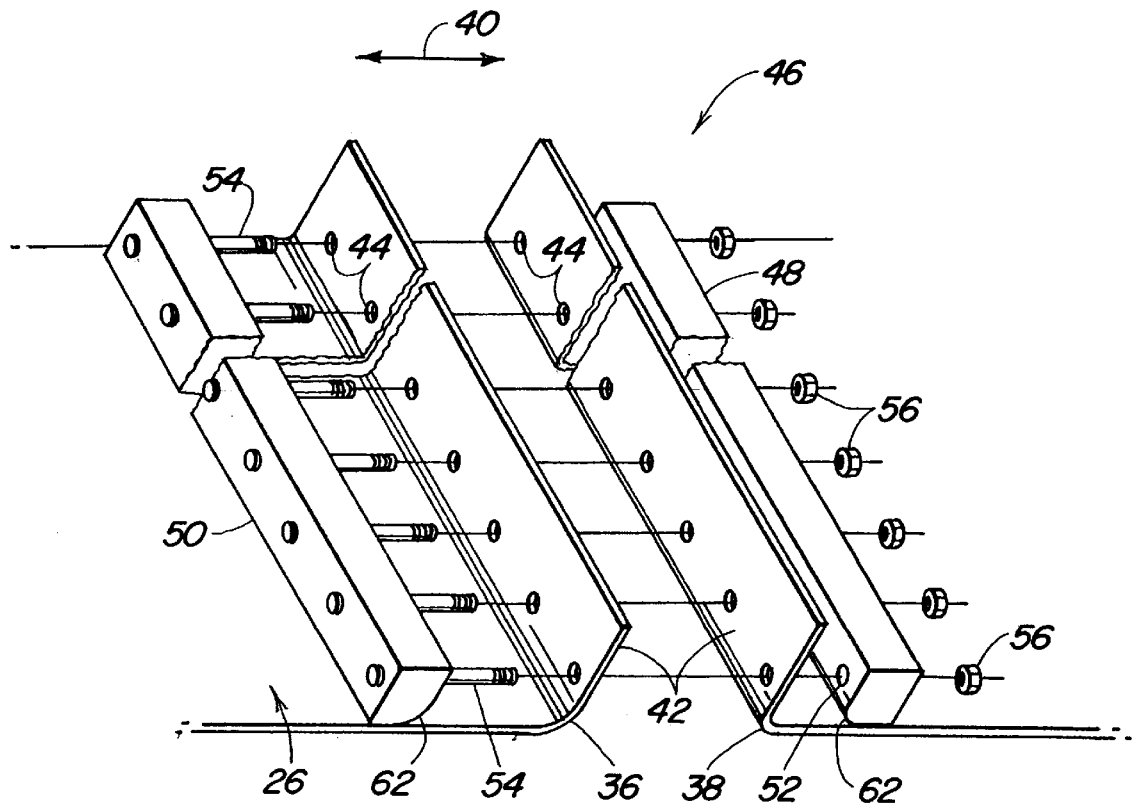
FIG. 2 is an exploded perspective view of the belt end connector assembly.
Figure 3:
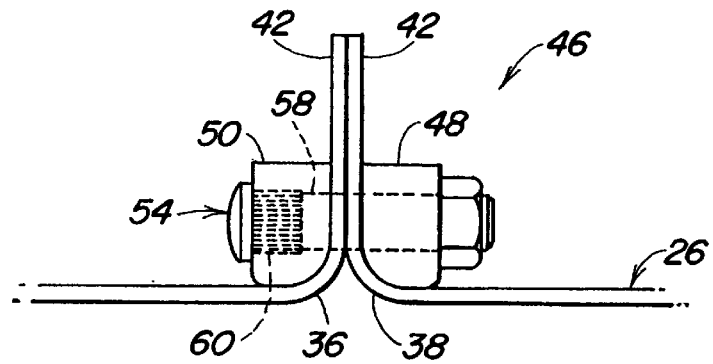
FIG. 3 is an assembled side view of the belt end connector assembly.

The draper belts are wide, flat belts as shown in FIG. 2. The side and center belts 26, 27 are generally the same, differing only in width and length. The belts have opposite ends 36, 38 that are joined together to form a continuous belt. The belt is moved over rollers (not shown) in a belt travel direction shown by the arrow 40 in FIG. 2. Each belt end has an upstanding belt end flange 42. The two belt end flanges 42 each have an array of apertures 44 that mate with one another when the belt ends are brought together.

The belt ends are held together by a belt end connector assembly 46. The assembly 46 includes a first connecting bar 48 and a second connecting bar 50. The connecting bars are solid bars, preferably made of metal, and can be formed by extrusion. Other materials, including plastics may be used for the connecting bars. The first connecting bar 48 is provided with an array of through bores 52 that align with the apertures 44 in the belt end flanges 42.

The second connecting bar has a plurality of threaded studs 54 affixed thereto. The studs project through the apertures 44 in the belt end flanges 42 and through the bores 52 in the first connecting bar 48. Lock nuts 56 are threaded onto the distal ends of the studs 54 to hold the connecting bars and the upstanding belt end flanges together.

The studs 54 have a shaft 58, a portion 60 of which is knurled to grip the second connecting bar 50 to hold the studs 54 firmly in place. The studs 54 are press fit into the second connecting bar 50. The fixed studs 54 eliminate the need for separate bolts that must be manually manipulated to insert the bolts through both connecting bars. The connector assembly thus uses fewer separate components than prior connector assemblies do. In addition, by utilizing lock nuts 56, lock washers are no longer needed, further reducing the number of separate fastener components to be assembled. Fixing the studs to the second connecting bar 50 also eliminates the need to use a second wrench on a bolt head. As a result, assembly and disassembly of the connector assembly is greatly simplified compared to other connector assemblies having separate bolts, nuts and lock washers.

As can be seen from FIG. 2, the connecting bars have a generally rectangular sectional shape. The corner 62 of each connecting bar engages the belt at the base of the belt end flanges 42. The corner 62 is more rounded than the other corners of the connecting bars. This provides a relief to the belt as the connector assembly travels around the rollers supporting the draper belt 26. When fully assembled, the connector assembly forms a cleat raised from the flat surface of the belt. This cleat helps to convey crop material along with the other cleats (not shown) typically formed with the belt 26. The same connector assembly is used with the center draper belt 27.

The invention should not be limited to the above-described embodiment, but should be limited solely to the claims that follow.

We claim:

1. A platform for a harvesting machine comprising at least one crop conveying belt with opposite ends joined together forming a continuous belt, the belt ends having mating upstanding flanges extending transversely to a direction of belt travel and the upstanding belt end flanges having aligned apertures, a belt connector assembly comprising first and second solid connecting bars on opposite sides of the belt end flanges, the first and second connecting bars having a generally rectangular section with a rounded corner engaging the belt at the base of the upstanding belt end flanges, the first connecting bar having a plurality of through bores aligned with the apertures of the upstanding belt end flanges, the second connecting bar having a plurality of threaded studs affixed thereto and having a knurled portion that is press fit into the second connecting bar to affix the studs to the second connecting bar, the studs having threaded portions projecting therefrom through the aligned apertures in the upstanding belt end flanges and the bores in the first connecting bar, and lock nuts threaded onto distal end portions of the studs to hold the connecting bars and the upstanding belt end flanges together.

2. The platform as defined by claim 1 wherein the first and second connecting bars are made of metal.

3. The platform as defined by claim 1 wherein the first and second connecting bars are made of plastic.

* * * * *